US009336299B2

(12) United States Patent
Wang et al.

(10) Patent No.: US 9,336,299 B2
(45) Date of Patent: May 10, 2016

(54) ACQUISITION OF SEMANTIC CLASS LEXICONS FOR QUERY TAGGING

(75) Inventors: Ye-Yi Wang, Redmond, WA (US); Xiao Li, Bellevue, WA (US); Raphael Dominik Hoffmann, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1115 days.

(21) Appl. No.: 12/426,370

(22) Filed: Apr. 20, 2009

(65) Prior Publication Data
US 2010/0268725 A1    Oct. 21, 2010

(51) Int. Cl.
*G06F 17/30* (2006.01)
*G06F 17/27* (2006.01)

(52) U.S. Cl.
CPC ...... *G06F 17/30672* (2013.01); *G06F 17/2735* (2013.01); *G06F 17/2785* (2013.01)

(58) Field of Classification Search
CPC .......... G06F 17/2735; G06F 17/30672; G06F 17/2785
USPC ............................ 707/4, 740, 5; 705/2; 704/9
See application file for complete search history.

(56) References Cited

U.S. PATENT DOCUMENTS

| 5,794,050 A | 8/1998 | Dahlgren et al. |
| 6,101,515 A | 8/2000 | Wical et al. |
| 6,389,436 B1 * | 5/2002 | Chakrabarti ........ G06F 17/3071 707/999.003 |
| 6,766,320 B1 | 7/2004 | Wang et al. |
| 7,269,598 B2 | 9/2007 | Marchisio |
| 2002/0152202 A1 | 10/2002 | Perro et al. |
| 2006/0212433 A1 | 9/2006 | Stachowiak et al. |
| 2007/0250306 A1 * | 10/2007 | Marcu ................. G06F 17/2827 704/9 |
| 2008/0256069 A1 * | 10/2008 | Eder ....................... G06Q 90/00 |

(Continued)

FOREIGN PATENT DOCUMENTS

| EP | 1939797 A1 | 7/2008 |
| WO | 2009006911 A1 | 1/2009 |

OTHER PUBLICATIONS

Talukdar et al., "A Context Pattern Induction Method for Named Entity Extraction," In the Proceedings of the 10th Conference on Computational Natural Language Learning (CoNLL-X), New York City, 2006, pp. 141-148, 8 pages.*

(Continued)

*Primary Examiner* — Wei Zhen
*Assistant Examiner* — Mohammed Huda
(74) *Attorney, Agent, or Firm* — Alin Corie; Sandy Swain; Micky Minhas

(57) ABSTRACT

A user's search experience may be enhanced by providing additional content based upon an understanding of the user's intent. Query tagging, the assigning of semantic labels to terms within a query, is one technique that may be utilized to determine the context of a user's search query. Accordingly, as provided herein, a query tagging model may be updated using one or more stratified lexicons. A list data structure (e.g., lists of phrases obtained from web pages) and seed distribution data (e.g., pre-labeled probability data) may be used by a graph learning technique to obtain an expanded set of phrases and their respective probabilities of corresponding with particular lexicons (e.g., semantic class lexicons). The expanded set of phrases may be used to group phrases into stratified lexicons. The stratified lexicons may be used as features for updating and/or executing the query tagging model.

21 Claims, 10 Drawing Sheets

(56) References Cited

U.S. PATENT DOCUMENTS

| | | | |
|---|---|---|---|
| 2009/0037398 | A1 | 2/2009 | Horvitz et al. |
| 2009/0089373 | A1* | 4/2009 | Donato .............. G06Q 10/107 709/205 |
| 2010/0070448 | A1* | 3/2010 | Omoigui ............ H01L 27/1463 706/47 |

OTHER PUBLICATIONS

Wang et al., "Semi-Supervised Learning of Semantic Classes for Query Understanding: from the Web and for the Web," In the Proceedings of the 18th ACM Conference on Information and Knowledge Management (CIKM), 2009, pp. 37-46, 10 pages.*

Zhou et al., "Learning with Local and Global Consistency", http://citeseerx.ist.psu.edu/viewdoc/download;jsessionid=EE84-304BBA64783BB865287DCAA4EDFF?doi=10.1.1.9.3480&rep=rep1&type=pdf.

Zhou et al., "Semi-Supervised Learning on Directed Graphs", http://www.kyb.mpg.de/publications/pdfs/pdf2781.pdf.

Zhu, Xiaojin, "Semi-Supervised Learning with Graphs", May 2005, http://www.lti.cs.cmu.edu/Research/Thesis/XiaojinZhu05.pdf.

Hearst, Marti, "Automatic Acquisition of Hyponyms from Large Text Corpora", 1992 http://acl.ldc.upenn.edu/C/C92/C92-2082.pdf.

Komachi, et al., "Minimally Supervised Learning of Semantic Knowledge from Query Logs", Apr. 3, 2009, http://cl.naist.jp/~mamoru-k/slides/ijcnlp-20080109.ppt.

Lafferty et al., "Conditional Random Fields: Probabilistic Models for Segmenting and Labeling Sequence Data", http://www.cis.upenn.edu/~pereira/papers/crf.pdf.

Li et al., "Learning Query Intent from Regularized Click Graphs", 2008, http://delivery.acm.org/10.1145/1400000/1390393/p339-li.pdf?key1=1390393&key2=6920678321&coll=GUIDE&dl=GUIDE&CFID=29529821&CFTOKEN=83589668.

Lin et al., "Concept Discovery from Text" http://www.aclweb.org/anthology-new/C/C02/C02-1144.pdf.

Page et al., "The PageRank Citation Ranking: Bringing Order to the Web", Jan. 31, 2007, http://www.cs.odu.edu/~mln/teaching/cs791-s07/?method=getElement&element=~week4~KleinVuppala.pdf.

Pantel et al., "Espresso: Leveraging Generic Patterns for Automatically Harvesting Semantic Relations", http://www.patrickpantel.com/Download/Papers/2006/acl06-01.pdf Peng et al., "Accurate Information Extraction from Research Papers using Conditional Random Fields", http://www.cs.umass.edu/~mccallum/papers/hlt2004.pdf.

Talukdar et al., "Weakly-Supervised Acquisition of Labeled Class Instances using Graph Random Walks", Oct. 2008, pp. 582-590, http://www.aclweb.org/anthology-new/D/D08/D08-1061.pdf.

TextGraphs. "TextGraphs: Graph-based algorithms for Natural Language Processing." from www.textgraphs.org.http://www.textgraphs.org/ws06, Jun. 9, 2006.

Wang, R. C., N. Schlaefer, et al. (2008). "Automatic Set Expansion for List Question Answering. Conference on Emperical Methods in Natural Language Processing". Honolulu, Hawaii, Association for Computational Liguistics. http://amsterdam.lti.cs.cmu.edu/papers/emnlp-2008.pdf.

Wang, et al., "Combination of Statistical and Rule-Based Approaches for Spoken Language Understanding", http://research.microsoft.com/pubs/75235/2002-yeyiwang-icslp.pdf.

Etzioni et al., "Advances in IE for the Web", Dec. 11, 2008, pp. 1-6, http://www.scienceforseo.com/uncategorized/advances-in-ie-for-the-web/.

Jones, Rosie, "Semi-Supervised Learning on Small Worlds", http://www.cs.cmu.edu/~dunja/LinkKDD2004/Rosie-Jones-LinkKDD-2004.pdf.

Wang et al., "Automatic Set Instance Extraction using the Web", Apr. 20-24, 2009, http://www.cs.cmu.edu/~wcohen/postscript/www-2009-sub.pdf.

Agichtein et al., "Snowball: Extracting Relations from Large Plain-Text Collections", http://www.mathcs.emory.edu/~eugene/papers/dl00.pdf.

Cafarella, et al., "WebTables: Exploring the Power of Tables on the Web", 2008 http://www.mitedu/~y_z/papers/webtables-vldb08.pdf.

Wang, Yi-Chia, "Learning Dictionaries for Information Extraction by Multi-Level Bootstrapping", http://www.cs.cmu.edu/~wcohen/10-707/ppts/Yi-Chia.ppt.

Etzioni, et al., "Methods for Domain-Independent Information Extraction from the Web: An Experimental Comparison", 2004, http://turing.cs.washington.edu/papers/aaai04.pdf.

Li et al., "Extracting Structured Information from User Queries with Semi-Supervised Conditional Random Fields," In the Proceedings of the 32nd ACM SIGIR Conference, 2009, pp. 572-579.

McCallum et al., "Early Results for Named Entity Recognition with Conditional Random Fields, Feature Induction and Web-Enhanced Lexicons," In the Proceedings of the 7th Conference on Natural Language Learning (CoNLL), Edmonton, Canada, 2003, vol. 4, pp. 188-191, 4 pages.

Sarawagi et al., "Semi-Markov Conditional Random Fields for Information Extraction," In the Proceedings of Advances in Neural Information Processing Systems, Vancouver, Canada, 2004, pp. 1185-1192, 8 pages.

Sha et al., "Shallow Parsing with Conditional Random Fields," In the Proceedings of Human Language Technology Conference and the Conference of the North American Chapter of the Association for Computational Linguistics, 2003, vol. 1, pp. 134-141, 8 pages.

Riloff et al., "Learning dictionaries for information extraction by multi-level bootstrapping," AAAI/IAAI, Jul. 1999, pp. 474-479, 6 pages.

\* cited by examiner

SEED DISTRIBUTION DATA — 402

| PHRASES | FRUIT | COLOR | MUSIC | TYPE |
|---|---|---|---|---|
| ORANGE | 0.6 | 0.4 | 0 | 0 |
| APPLE | 0.97 | 0 | 0 | 0 |
| KIWI | 0.9 | 0 | 0 | 0 |
| RED | 0 | 0.98 | 0 | 0 |
| YELLOW | 0 | 0.92 | 0 | 0 |
| ELECTRONIC | 0 | 0 | 0.23 | 0.77 |
| TECHNO | 0 | 0 | 1 | 0 |
| ROCK | 0 | 0 | 0.6 | 0 |
| HIP HOP | 0 | 0 | 1 | 0 |
| JAZZ | 0 | 0 | 1 | 0 |

FIG. 4

ACQUISITION OF SEMANTIC CLASS LEXICONS FOR QUERY TAGGING

BACKGROUND

A user's online search experience may be enhanced through better understanding of the user's intent. Query tagging, the assigning of semantic labels to terms within a query (e.g., a user's search query), is one technique that may be utilized to determine the context of the query. The semantic labels assigned to terms within the query may be used to retrieve relevant information about the user's needs. For example, a phrase "digital camera" within a query may be labeled as a "product class". The semantic label "product class" may be used to retrieve additional content (e.g., contextual advertisements relating to products) that may be presented to the user for an enhanced experience.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A technique for updating a query tagging model using one or more stratified lexicons is disclosed herein. A list data structure comprising a set of lists may be created. Respective lists within the set of lists may comprise one or more phrases. For example, a set of HTML lists (e.g., order lists, unordered list, tables, etc.) comprises phrases (e.g., strings of text) may be obtained from web resources (e.g., a webpage) by, for example, crawling the web. The list data structure may be filtered based upon one or more criteria (e.g., maximum length of phrases, number of phrases occurring within a list, etc.). Seed distribution data comprising one or more phrases may be created. Respective phrases may comprise lexicon probability distributions based upon, for example, a set of labeled training data. A lexicon probability distribution of a phrase may comprise one or more probabilities, wherein a probably corresponds to a probability the phrase relates to a particular lexicon. It may be appreciated that semantic class lexicons may be referred to as lexicons and that a lexicon may, for example, refer to the semantic meaning of phrases (e.g., "Brand", "Model", "Product class", "Attribute", etc.).

A sub-graph may be created based upon the list data structure and the seed distribution data. One or more lists and one or more phrases from the list data structure may be removed based upon the seed distribution data. A graph learning technique (e.g., a graph learning algorithm) may be executed upon the sub-graph to create an expanded set of phrases, wherein a phrase comprises an updated lexicon probability distribution. For example, lists within the list data structure may be assigned list lexicon probability distributions based upon lexicon probability distributions of phrases comprised within the lists. The expanded set of phrases may be created by assigning updated lexicon probability distribution to phrases based upon the list lexicon probability distribution of the particular lists comprising the phrases. The updated lexicon probability distribution may comprise one or more updated lexicon probabilities, wherein an updated lexicon probability corresponds to a probability that a phrase relates to a particular lexicon.

One or more stratified lexicons may be created based upon the expanded set of phrases. A stratified lexicon may comprise a set of phrases, wherein respective phrases within the set of phrases have updated lexicon probabilities within a predefined range. One or more stratified lexicons may be associated with a particular lexicon. A query tagging model may be updated using one or more stratified lexicons as lexicon features. Query tagging may be performed through updating the query tagging model (e.g., Conditional Random Fields). Updating the query tagging model may provide improved query tagging performance and may mitigate the use of training data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 is an illustration of an example of seed distribution data.

DETAILED DESCRIPTION

Figure 1:
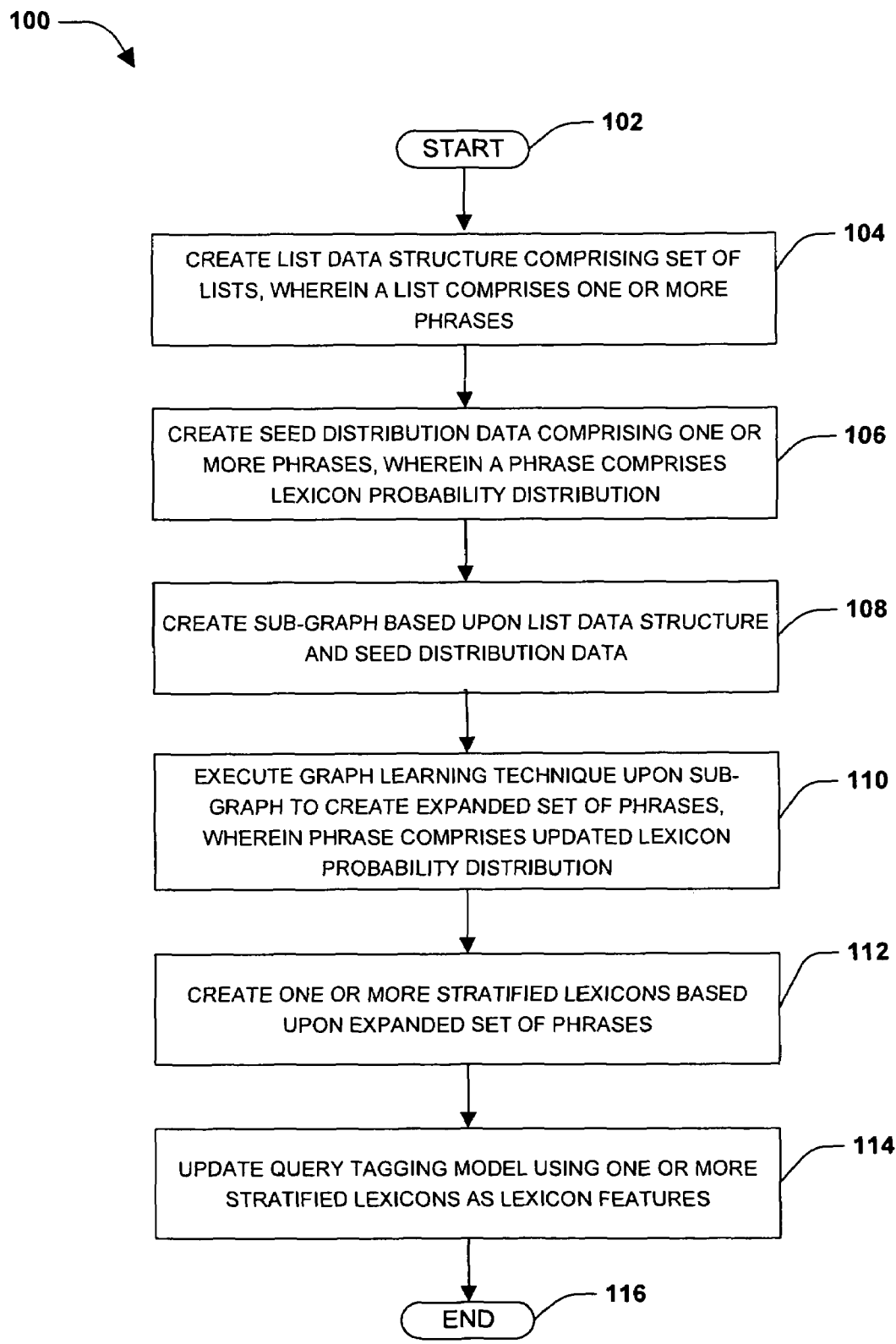
FIG. 1 is a flow chart illustrating an exemplary method of updating a query tagging model using one or more stratified lexicons.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Query tagging through a query tagging model (e.g., a learned sequential statistical labeling model) may be used to label terms within a user's search query. These semantic class labels may be used to understand the context of the user's search query, such that additional relevant information (e.g., related news feeds, targeted advertisements, additional product information, hyperlinks to related web pages, etc.) may be provided to the user to improve their experience. Updating the query tagging model may require substantial human effort in annotating a training set used to update the query tagging model. Currently, semantic class lexicons may be used to mitigate the need for manual annotations, but again manual effort may be needed to maintain the semantic class lexicons as search topics evolve over time. Prior work on semantic class lexicon acquisition has focused on the precision of acquired semantic class lexicons, which has shown to be inadequate for the task of query tagging.

Among other things, a technique for updating a query tagging model using one or more stratified lexicons is provided herein. In one example, the technique may be implemented as a semi-supervised learning algorithm which leverages structured data to create stratified lexicons used to enhance query tagging performance and mitigate the need for training data. The stratified lexicons may be used to train the query tagging model to identify and understand the context of a user's search query. Understanding the context of a user's search query allows for additional content relevant to the user's intent to be provided to the user. In other example, the acquisition of stratified lexicons may be used to label information within web resources (e.g., entries within an online information database).

One embodiment of updating a query tagging model using one or more stratified lexicons is illustrated by an exemplary method 100 in FIG. 1. At 102, the method begins. At 104, a list data structure (e.g., see FIG. 3A and FIG. 3B) comprising a set of lists may be created. A list within the list data structure may comprise one or more phrases (e.g., a table comprising one or more phrases). The list data structure may be filtered based upon particular criteria. In one example, the set of lists may be derived from a set of HTML lists obtained from web resources (e.g., ordered lists and/or unordered lists within web pages). Because web resources may be noisy and comprise information of little use, the set of HTML lists may be filtered. For example, HTML lists having a number of phrases (e.g., 2 phrases, 900 phrases) outside a predefined range (e.g., remove HTML lists comprising less than 4 phrases and greater than 300 phrases) may be removed from the set of HTML lists. In another example, HTML lists may be filtered based upon the maximum length of phrases (e.g., remove HTML lists comprising phrases with a number of characters greater than 60). It may be appreciated that in one example, HTML lists may be filtered to remove SPAM lists and/or web lists used to format the layout of a webpage, rather than HTML lists grouping semantically related phrases. The set of lists may be created based upon the filtered set of HTML lists.

At 106, seed distribution data (e.g., see FIG. 4) comprising one or more phrases may be created, wherein a phrase within the seed distribution data may comprise a lexicon probability distribution. It may be appreciated that a lexicon probability distribution may comprise one or more probabilities corresponding to probabilities that a phrase relates to a particular lexicon. For a particular phrase within the seed distribution data, a probability may be assigned to one or more lexicons based upon a set of labeled training data. For example, a phrase "orange" may occur within the seed distribution data.

A first probability of 0.6 may be assigned to a lexicon "fruit", wherein the probability that the phrase "orange" relates to the lexicon "fruit" is 60%. A second probability of 0.4 may be assigned to a lexicon "color", wherein the probability that the phrase "orange" relates to the lexicon "color" is 40%. These probabilities may be comprised within a lexicon probability distribution for the phrase "orange". The probabilities within the lexicon probability distribution may be derived from a set of labeled training data (e.g., phrases manually labeled by user input to characterize the phrases). For example, probabilities may be determined based upon counting a number of times a particular phrase is labeled as a particular lexicon within the labeled training data.

At 108, a sub-graph (see FIG. 5C) may be created based upon the list data structure and the seed distribution data. It may be appreciated, that the list data structure, in one example, may represent phrases and/or lists in a graph format. The sub-graph may be derived from the list data structure because the list data structure may comprise an unworkable amount of data for graph learning techniques (e.g., a graph walking algorithm) to execute upon.

In one example, one or more phrases (e.g., phrases within the list data structure matching phrases within the seed distribution data) within the list data structure may be labeled with a corresponding lexicon probability distribution. For example, if a phrase "orange" occurs within the list data structure and the seed distribution data, then "orange" within the list data structure may be labeled with the corresponding lexicon probability distribution (e.g., 0.4 "color", 0.6 "fruit", etc.) from the seed distribution data. Lists having a number of phrases labeled with a lexicon probability distribution below a predetermined threshold may be removed from the list data structure. For example, a list threshold may be set at 3, wherein lists comprising less than 3 phrases that were labeled with lexicon probability distributions from the seed distribution data may be removed.

Once the lists within the list data structure have been removed based upon the predetermined threshold, phrases within the list data structure occurring within the remaining lists at a frequency below a predetermined threshold may be removed. For example, a phrase threshold may be set to 2. Phrases within the list data structure that occur in less than 2 lists within the list data structure may be removed from the lists data structure. Once the appropriate lists and phrases have been removed from the list data structure, the sub-graph may be created from the remaining lists and phrases.

Figure 6A:
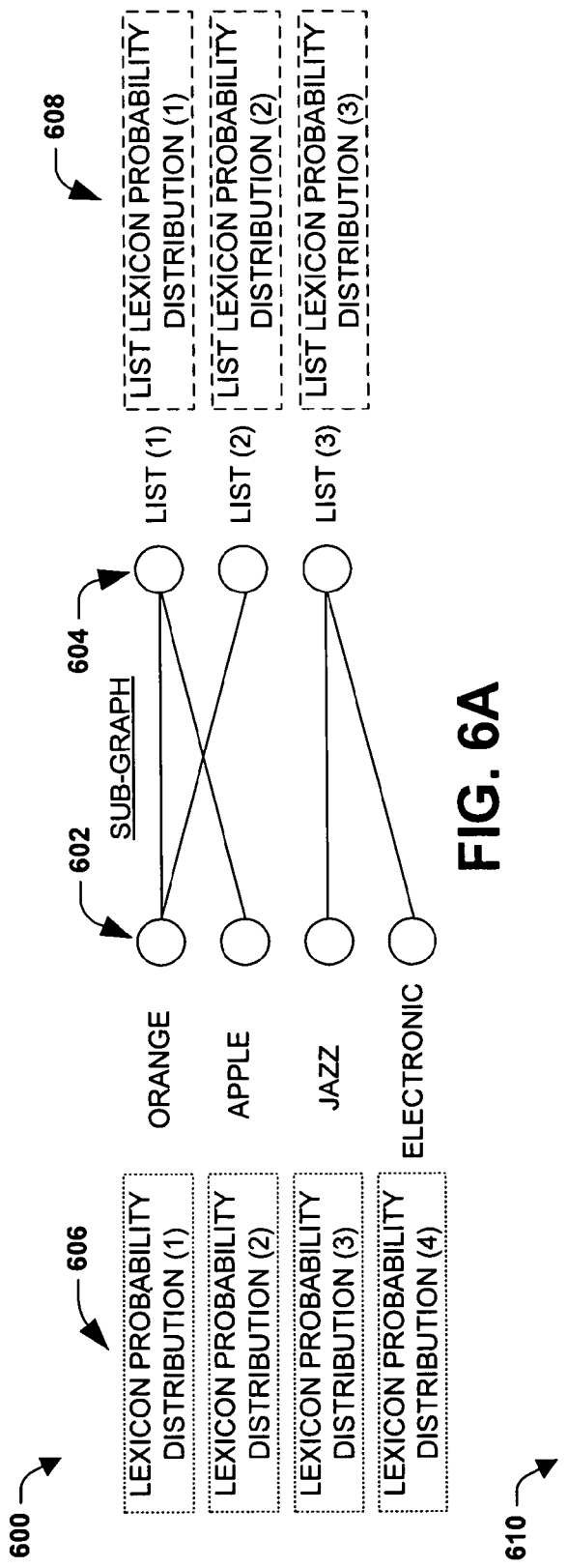
FIG. 6A is an illustration of an example of executing a graph learning technique upon a sub-graph to create an expanded set of phrases.
Figure 6B:
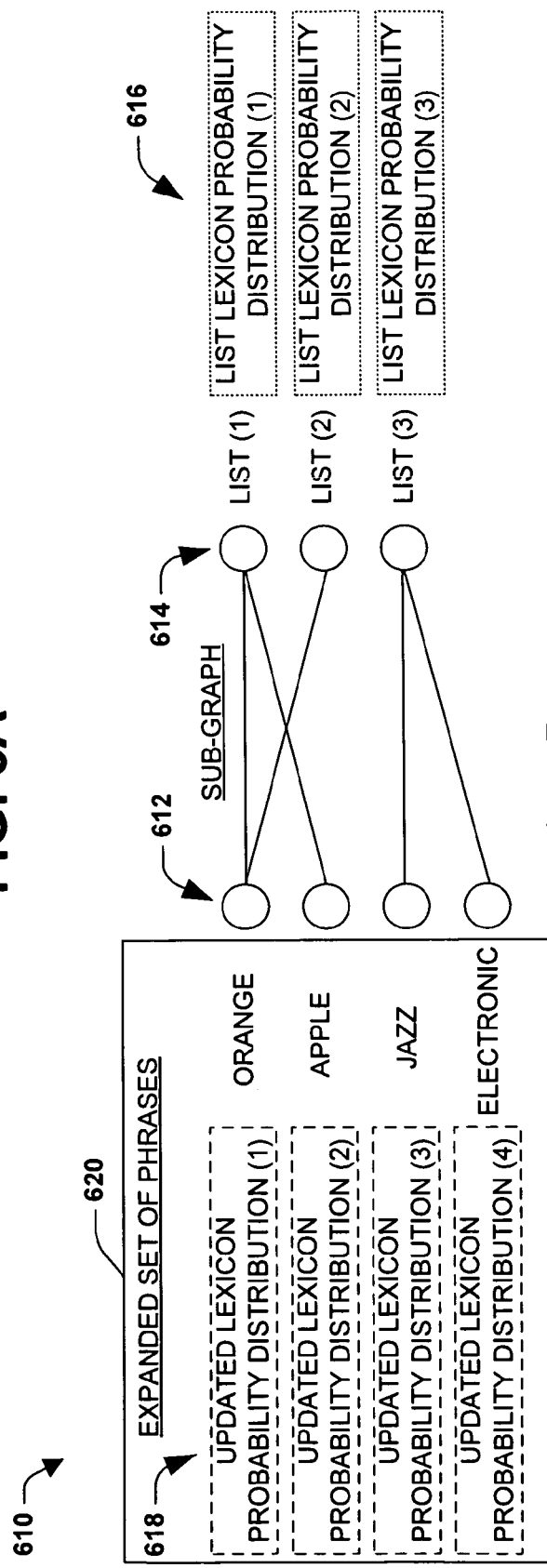
FIG. 6B is an illustration of an example of executing a graph learning technique upon a sub-graph to create an expanded set of phrases.

At 110, a graph learning technique may be executed upon the sub-graph to create an expanded set of phrases (e.g., see FIG. 6B). For example, the sub-graph may already comprise phrases with lexicon probability distributions assigned from the seed distribution data. Based upon the graph learning technique, additional phrases may be assigned lexicon probability distributions, thus creating an expanded set of phrases.

In one example of executing a graph learning technique, list lexicon probability distributions may be assigned to particular lists and updated lexicon probability distributions may be assigned to phrases iteratively. For particular lists within the sub-graph, a list lexicon probability distribution may be assigned to a particular list based upon lexicon probability distributions of phrases comprised within the list (e.g., a list comprising a phrase "orange" and a phrase "red" may be assigned a list lexicon probability distribution based upon respective lexicon probability distributions of the phrase "orange" and the phrase "red"). It may be appreciated that a list may comprise one or more phrases that do not have lexicon probability distributions that were assigned from the seed distribution data because that phrase did not occur within the seed distribution data.

For particular phrases within the sub-graph, an updated lexicon probability distribution may be assigned to a particular phrase based upon list lexicon probability distributions of lists comprising the phrase. For example, a phrase "salmon" may occur in a first list and a second list having respective list lexicon probability distributions. The phrase "salmon" may be assigned an updated lexicon probability distribution based upon the respective list lexicon probability distributions of the first list and second list. The phrase "salmon" is assigned the updated lexicon probability distribution because it may have a similar probability of relating to particular lexicons as other phrases within the first list and second list which were assigned list lexicon probability distributions based upon the phrases they comprise.

At 112, one or more stratified lexicons (e.g., see FIG. 7) may be created based upon the expanded set of phrases. It may be appreciated that a particular lexicon may comprise one or more stratified lexicons. In one example, a set of phrases within the expanded set of phrases maybe be grouped into a stratified lexicon. The grouping, for example, may be performed by grouping phrases with update lexicon probabilities within a predefined range. For example, a lexicon "color" may comprise one or more stratified lexicons. A first stratified lexicon of the lexicon "color" may comprise a set of phrases (e.g., a phrase "red", a phrase "green", and a phrase "blue") having an updated lexicon probability distribution between 0.9 to 1 relating to the lexicon "color". A second stratified lexicon of the lexicon "color" may comprise a set of phrases (e.g., "salmon", "grape", "yellow", etc.) having an updated lexicon probability distribution between 0.8 to 0.9 relating to the lexicon "color". One or more stratified lexicons may be associated with a corresponding lexicon (e.g., a lexicon may be associated with stratified lexicons corresponding to predefined ranges 0.9 to 1, 0.8 to 0.9, 0.7 to 0.8, 0.6 to 0.7, 0.5 to 0.6, etc.).

At 114, a query tagging model (e.g., a conditional random fields tagging model) may be updated using one or more stratified lexicons as lexicon features. Lexicon features may be defined based upon a query, a position of a current term within the query, a current label that is to be assigned to the current term, and a previous label assigned to a previous term within the query. In one example, the query tagging model may be executed upon a query (e.g., "Picture Maker Camera in Orange") comprising one or more terms (e.g., "Picture Maker", "Camera", "Orange", etc.). For respective terms within the query, one or more labels (e.g., semantic class labels derived from stratified lexicons of particular lexicons) may be assigned to a term based upon an occurrence of the one or more terms (e.g., a current term, a pervious term and a respective label of the previous term, etc.) within a stratified lexicon. For example, the term "Picture Maker" may be assigned a label "brand" based upon its occurrence within a stratified lexicon of a lexicon "brand". The term "camera" may be assigned a label "type" based upon its occurrence within a stratified lexicon of a lexicon "type". The term "Orange" may be assigned a label "attribute" based upon its occurrence within a stratified lexicon of a lexicon "attribute".

More formally, the query tagging model may be updated with the introduction of lexicons features as a function of $f_{L,j}^{LEX}(y_{t-1}, y_t, x, t) = \delta(L \Rightarrow [x_t])\delta(y_t = j)$, wherein x is a query, t is the position of a current term within the query, $y_t$ is a current label that is to be assigned to the current term, $y_{t-1}$ is a previous label assigned to a previous term within the query, $L \Rightarrow [x_t]$ is a determination whether an entry within a stratified lexicon L comprises a substring of the query x, and the substring covers the current term $x_t$, and j is a label. At 116, the method ends.

Figure 2:
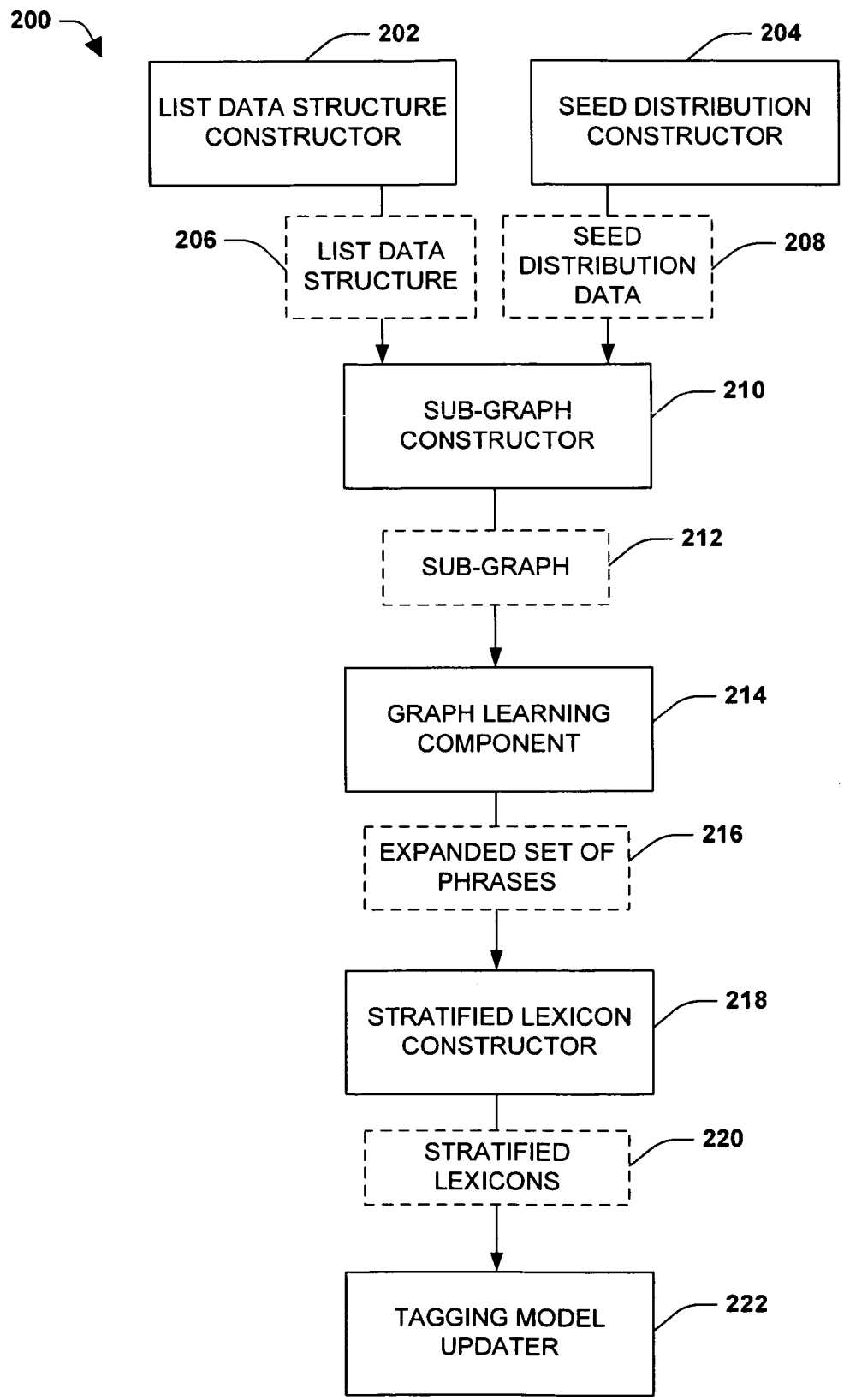
FIG. 2 is a component block diagram illustrating an exemplary system for updating a query tagging model using one or more stratified lexicons.

FIG. 2 illustrates an example 200 of a system configured for updating a query tagging model using one or more stratified lexicons. The system may comprise a list data structure constructor 202, a seed distribution constructor 204, a sub-graph constructor 210, a graph learning component 214, a stratified lexicon constructor 218, and/or a tagging model updater 222. The list data constructor 202 may be configured to create a list data structure 206 comprising a set of lists. Respective lists within the list data structure 206 may comprise one or more phrases. In one example, one or more lists may be obtained from web resources (e.g. a set of HTML lists obtained from one or more web pages). It may be appreciated that the list data structure 206 may be filtered to remove undesirable lists (e.g., lists comprising a number of phrases greater than or less than a desired range, lists comprising phrases having a maximum length larger than a desired length, etc.).

The seed distribution constructor 204 may be configured to create seed distribution data 208 comprising one or more phrases. A phrase within the seed distribution data 208 may comprise a lexicon probability distribution. For example, for particular phrases within the seed distribution data 208, a probability may be assigned to one or more lexicons based upon a set of labeled training data. That is, a lexicon probability distribution of a phrase may comprise one or more probabilities, wherein a probability may relate to the probability the phrase corresponds to a particular lexicon (e.g., a phrase "orange" may have a 0.4 probability of relating to a lexicon "color").

The sub-graph constructor 210 may be configured to create a sub-graph 212 based upon the list data structure 206 and the seed distribution data 208. For example, one or more phrases within the list data structure 206 may be labeled with a corresponding lexicon probability distribution based upon the seed distribution data 208. It may be appreciated that one or more phrases within the list data structure 206 may not match phrases within the seed distribution data, and thus may not be assigned lexicon probability distributions. Lists having a number of phrases labeled with a lexicon probability distribution below a predetermined threshold may be removed from the list data structure 206 (e.g., lists comprising less than 3 phrases having lexicon probability distributions may be removed because the lists may not comprise enough useful lexicon probability distribution data to create an expanded set of phrases).

Once respective lists are removed, phrases may be removed from the list data structure 206. That is, phrases occurring within the remaining lists at a frequency below a predetermined threshold may be removed from the list data structure 206 because the phrases may not be useful in creating the expanded set of phrases (e.g., phrases occurring in less than 5 lists may be removed, phrases occurring in none of the remaining lists may be removed, etc.). The sub-graph 212 may be created by the sub-graph constructor 210 based upon the remaining phrases and lists within the list data structure 206.

The graph learning component 214 may be configured to execute a graph learning technique upon the sub-graph 212 to create an expanded set of phrases 216, wherein a phrase comprises an updated lexicon probability distribution. In one example, for particular lists within the sub-graph 212, a list lexicon probability distribution may be assigned to a particular list based upon lexicon probability distributions of phrases comprised within the list. Once list lexicon probability distributions assigned, for particular phrases within the sub-graph 212, an updated lexicon probability may be assigned to a particular phrase based upon list lexicon probability distributions of lists comprising the phrase. The expanded set of phrases 216 may be created based upon the list of phrases within the sub-graph 212 and their respective updated lexicon probability distributions. It may be appreciated that an updated lexicon probability distribution may comprise one or more lexicon probabilities (e.g., probability that a particular phrase is associated with a particular semantic class lexicon).

The stratified lexicon constructor 218 may be configured to create one or more stratified lexicons 220 based upon the expanded set of phrases 216. For example, a set of phrases within the expanded set of phrases may be grouped into a stratified lexicon. The grouping, for example, may be performed by grouping phrases with updated lexicon probabilities within a predefined range. One or more stratified lexicons may be associated with a corresponding lexicon.

The tagging model updater 222 may be configured to update (e.g., train) a query tagging model using one or more stratified lexicons 220 as lexicon features. For example, the query tagging model (e.g., a conditional random fields tagging model) may be executed upon a query to label one or more terms within the query using the one or more stratified lexicons 220. For respective terms within the query, one or more labels (e.g., semantic class labels derived from stratified lexicons of particular lexicons) may be assigned to a term based upon an occurrence of the one or more terms (e.g., a current term, a pervious term and respective label of the previous term, etc.) within a stratified lexicon of a corresponding lexicon.

Figure 3A:
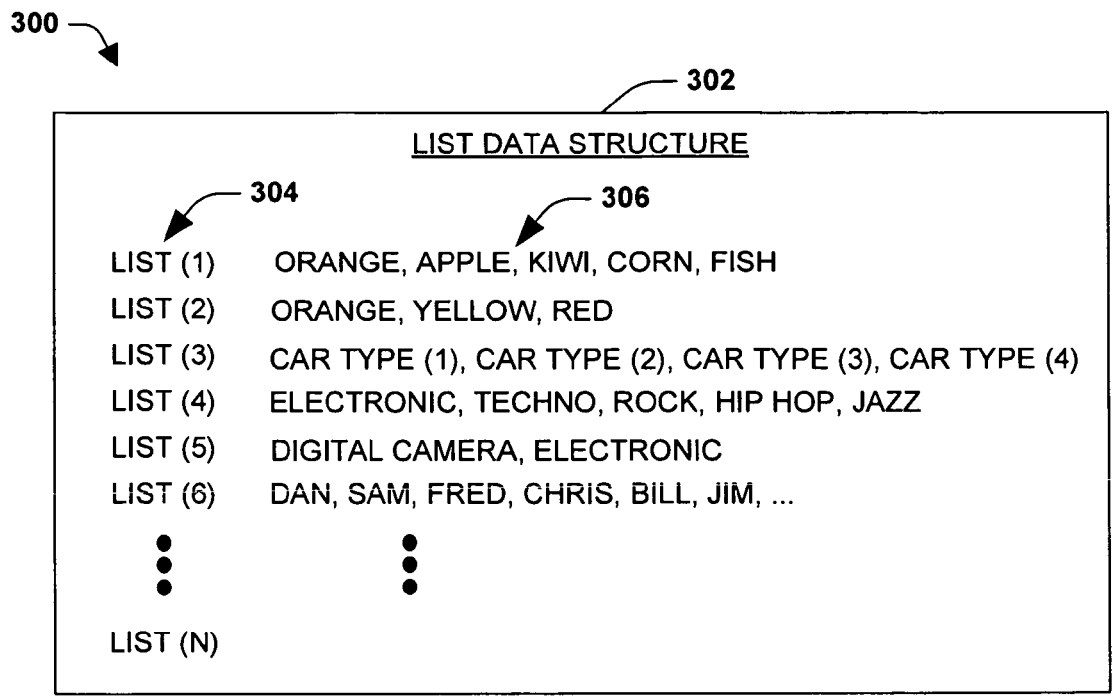
FIG. 3A is an illustration of an example of a list data structure.

FIG. 3A illustrates an example 300 of a list data structure 302. The list data structure 302 may comprise one or more lists 304. Respective lists within the list data structure 302 may comprise one or more phrases 306. For example, list (1) may comprise the phrases "orange", "apple", "kiwi", "corn", and "fish". List (2) may comprise the phrases "orange", "yellow", and "red".

Figure 3B:
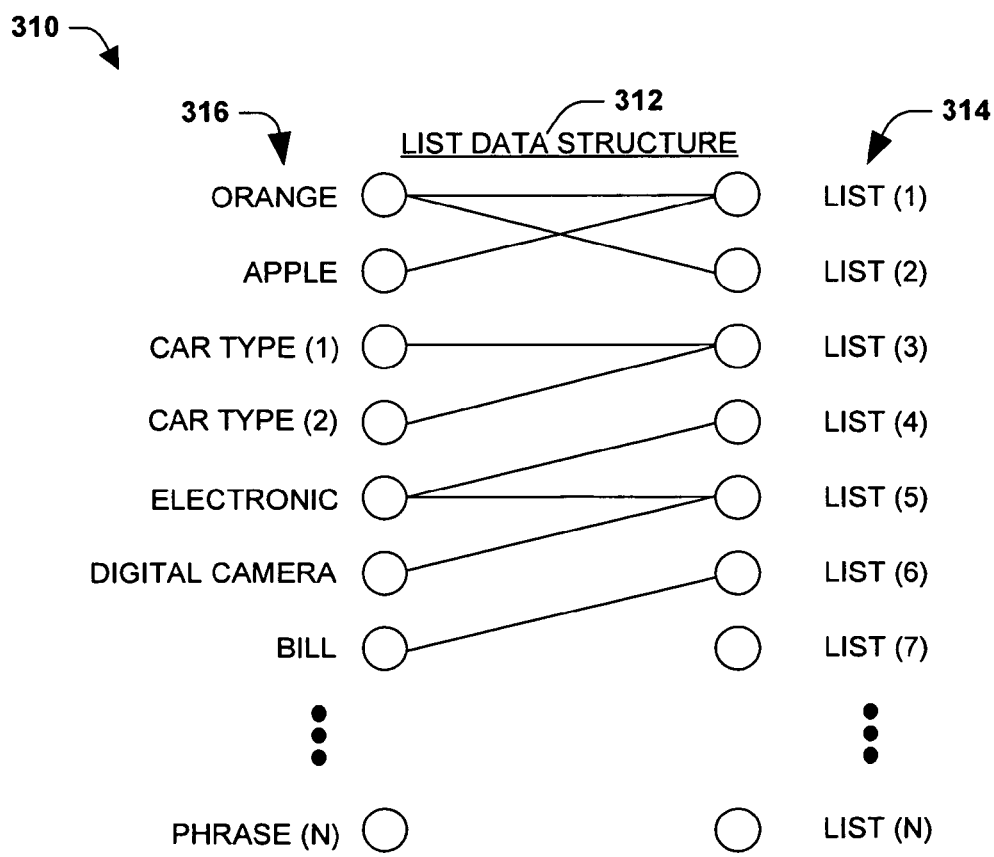
FIG. 3B is an illustration of an example of a list data structure.

FIG. 3B illustrates an example 310 of a list data structure 312 in the format of a graph. The list data structure 312 may comprise one or more lists 314 and one or more phrases 316. Within the graph format, respective phrases may be associated (e.g., linked) with particular lists comprising the phrases. For example, the phrase "orange" is comprised within list (1) and list (2). The phrase "electronic" is comprised within list (4) and list (5).

FIG. 4 illustrates an example 400 of seed distribution data 402. The seed distribution data 402 may comprise one or more phrases 406. A phrase may comprise lexicon probability distribution. The lexicon probability distribution may comprise one or more probabilities, corresponding to the probability the phrase relates to a particular lexicon. For example, the phrase "orange" has a 0.6 probability 408 corresponding to a "lexicon" fruit 404 and a 0.4 probability corresponding to a lexicon "color". The seed distribution data 402 may be created based upon labeled training data (e.g., one or more phrases manually labeled by users).

Figure 5A:
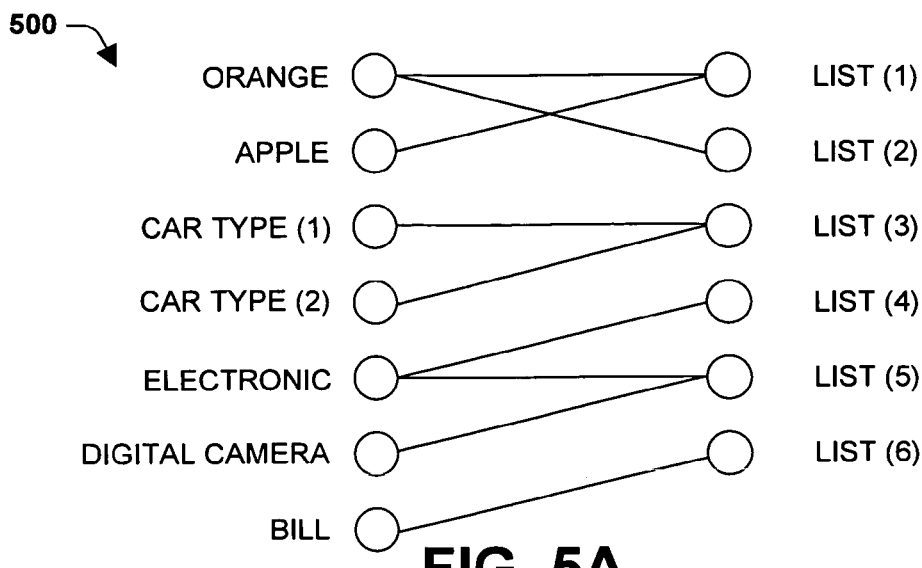
FIG. 5A is an illustration of an example of a list data structure used to create a sub-graph.

FIG. 5A illustrates an example 500 of list data structure used to create a sub-graph. The list data structure may comprise one or more lists, wherein respective lists comprise one or more phrases. The one or more phrases may be labeled with lexicon probability distributions based upon seed distribution data. For example, if a phrase within the list data structure matches a phrase within the seed distribution data, then the lexicon probability distribution of the phrase within the seed distribution data may be labeled to the phrase within the list data structure. If a phrase within the list data structure does not match a phrase within the seed distribution data, then the phrase is not labeled. It may be appreciated that the list data structure may comprise many more lists and/or phrases (e.g., tens of millions of lists and phrases) than depicted in example 500.

Figure 5B:
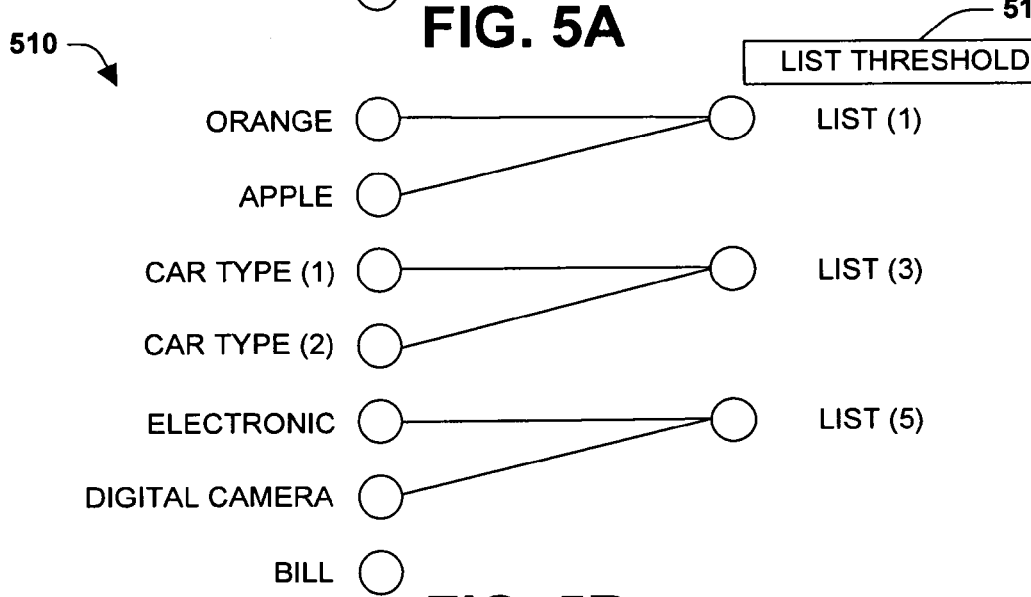
FIG. 5B is an illustration of an example of a list data structure used to create a sub-graph.

FIG. 5B illustrates an example 510 of a list data structure (e.g., the list data structure of FIG. 5A) used to create a sub-graph. One or more of the phrases within the list data structure may be labeled with lexicon probability distributions based upon seed distribution data. A list threshold=(2) 512 may be set, wherein lists within the list data structure comprising less than 2 phrases having lexicon probability distributions may be removed. For example, list (2) may be removed because it comprises only 1 phrase, the phrase "orange" with a lexicon probability distribution. In this way, lists comprising less than 2 phrases having lexicon probability distributions may be removed from the list data structure. It may be appreciated that a list may comprise one or more phrases without lexicon probability distributions, thus a list having 8 phrases without lexicon probability distributions and 1 phrase with a lexicon probability distribution may be removed from the list data structure.

Figure 5C:
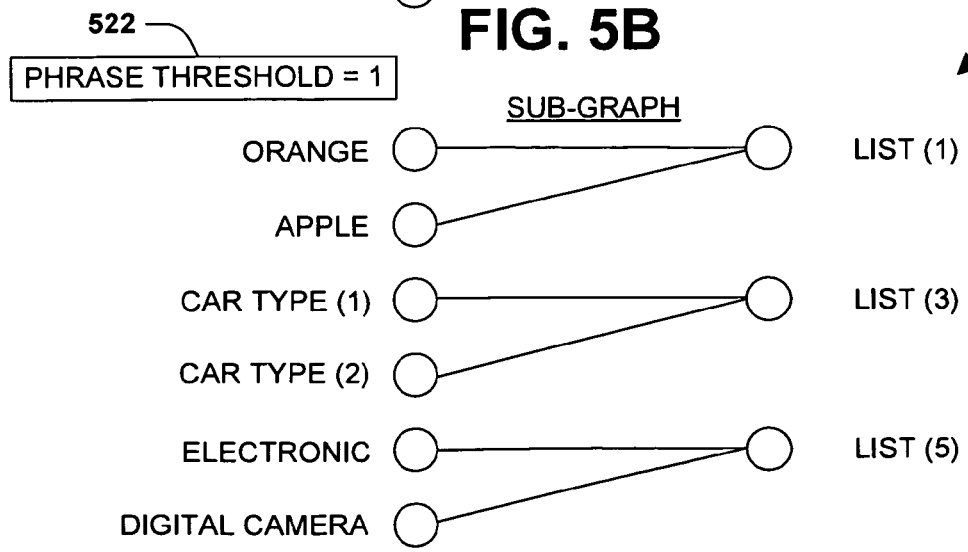
FIG. 5C is an illustration of an example of creating a sub-graph based upon a list data structure and seed distribution data.

FIG. 5C illustrates an example 520 of creating a sub-graph based upon a list data structure (e.g., the list data structure of FIG. 5B) and seed distribution data. In one example, the list data structure may be pared down by not only lists as in FIG. 5B, but also by phrases. A phrase threshold=(1) 522 may be set, such that phrases comprised within less than 1 list are removed from the list data structure (e.g., a phrase "Bill" is not comprised within a list and is therefore removed). A sub-graph may be created based upon a list data structure pared down by lists (e.g., the list data structure of FIG. 5B) and pared down by phrases (e.g., the list data structure of FIG. 5C).

FIG. 6A illustrates an example 600 of executing a graph learning technique upon a sub-graph to create an expanded set of phrases. In one example, a sub-graph may comprise one or more phrases 602 and one or more lists 604. Phrases within the sub-graph may comprise lexicon probability distributions 606 (e.g., lexicon probability distribution (1) may indicate that a phrase "orange" has a 0.4 probability of being a lexicon "color" and a 0.6 probability of being a lexicon "fruit").

List lexicon probability distributions 608 may be assigned to the one or more lists 604. A list lexicon probability distribution may be assigned to a particular list based upon lexicon probability distributions of phrases comprised within the list. For example, List (1) may be assigned a list lexicon probability distribution (1) based upon the lexicon probability distribution (1) corresponding to the phrase "orange" and a list lexicon probability distribution (2) corresponding to a phrase "apple" because the phrase "orange" and the phrase "apple" are comprised within the list (1). List (2) may be assigned a list lexicon probability distribution (2) based upon the lexicon probability distribution (1) because the phrase "orange" appears within list (2). It may be appreciated that one or more lists may comprise phrases that do not have lexicon probability distributions (e.g., no lexicon probability distribution was assigned from the seed distribution data), in which those phrases are not taken into account when assigning list lexicon probability distributions 608.

FIG. 6B illustrates an example 610 of executing a graph learning technique upon a sub-graph to create an expanded set of phrase. In one example, a sub-graph may comprise one or more phrases 612 and one or more lists 614. Lists within the sub-graph may comprise list lexicon probability distributions 616.

Updated lexicon probability distributions 618 may be assigned to the one or more phrases 612 to create an expanded set of phrases 620. An updated lexicon probability distribution may be assigned to a particular phrase based upon list lexicon probability distributions of lists comprising the phrase. For example, a phrase "orange" may be assigned an updated lexicon probability distribution (1) based upon a list lexicon probability distribution (1) and a list lexicon probability distribution (2) because list (1) and list (2) comprises the phrase "orange". A phrase "apple" may be assigned an updated lexicon probability distribution (2) based upon a list lexicon probability distribution (2) because list (1) comprises the phrase "apple".

It may be appreciated that one or more lists may comprise phrases that do not have lexicon probability distributions. Updated lexicon probability distributions 618 may be assigned to the phrases without lexicon probability distributions. In this way, the phrases within the sub-graph that did not have lexicon probability distributions now have updated lexicon probability distributions based upon the execution of the graph learning algorithm, thus expanding the set of phrases having lexicon probability distributions. It may be appreciated that phrases previously have lexicon probability distributions may be updated with updated lexicon probability distributions.

Figure 7:
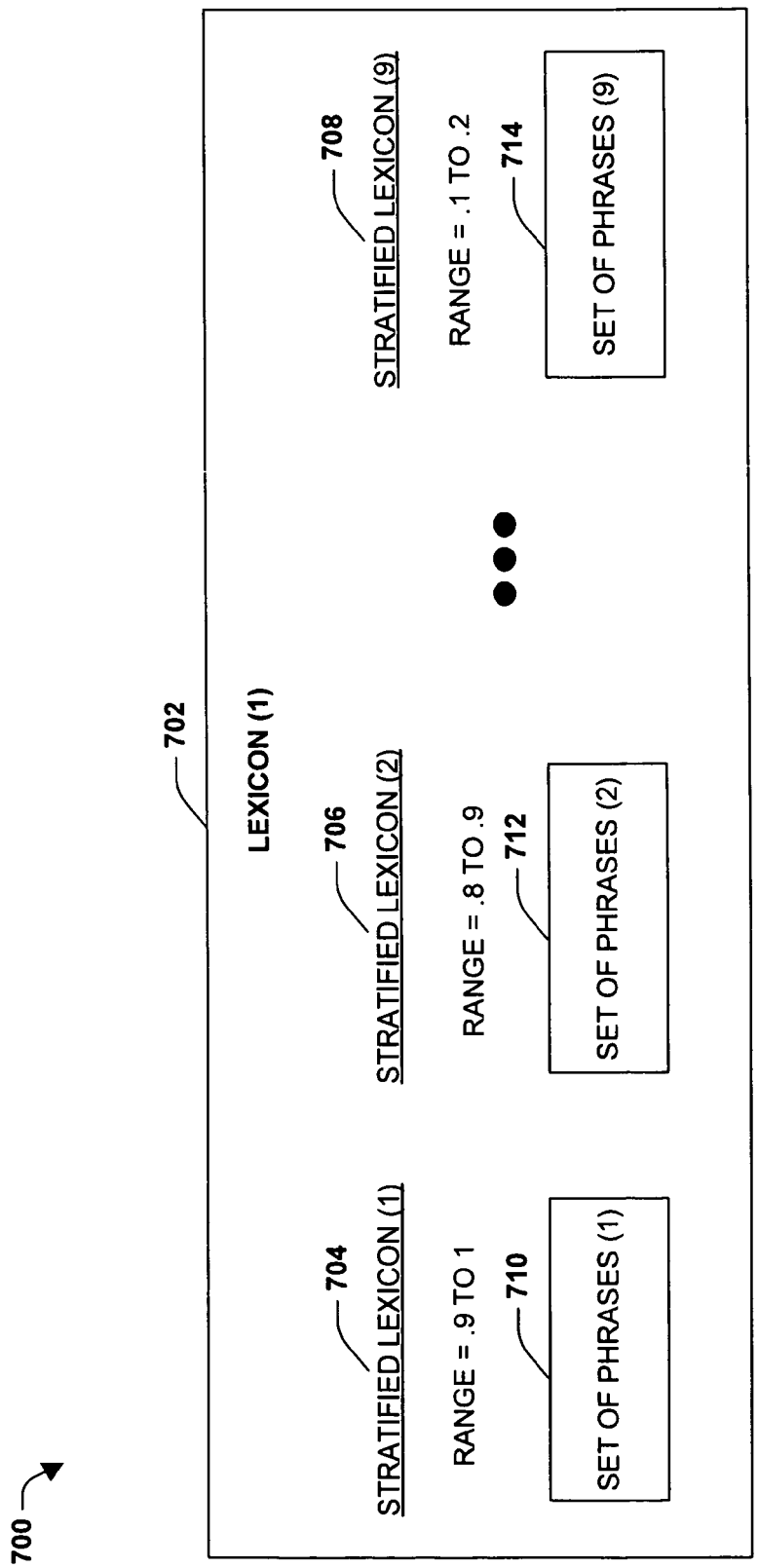
FIG. 7 is an illustration of an example of a lexicon comprising one or more stratified lexicons.

FIG. 7 illustrates an example 700 of a lexicon comprising one or more stratified lexicons. In one example, a lexicon (1) 702 (e.g., a lexicon "fruit") may comprise a stratified lexicon (1) 704, a stratified lexicon (2) 706, and up to a stratified lexicon (9) 708. It may be appreciated that a lexicon may comprise more or less stratified lexicons than those depicted in example 700 (e.g., if the span of a range is decreased from 0.1 to 0.5 then more stratified lexicons may be created, a stratified lexicon (10) could be created for a range 0.0 to 0.1, etc.). The lexicon (1) 702 in example 700 does not comprise a stratified lexicon having a range between 0 and 0.1 because the phrases within the stratified lexicon have such a low probability of being the lexicon (1) 702 that the phrases may not be useful.

The stratified lexicons within the lexicon (1) 702 may comprise sets of phrases based upon predefine ranges. For example the stratified lexicon (1) 704 may comprise a set of phrases (1) 710. The set of phrases (1) 710 may comprise phrases having an updated lexicon probability within a predefined range between 0.9 to 1 (e.g., a lexicon "fruit" may comprise the stratified lexicon (1) 704 comprising a phrase "kiwi", a phrase "banana", and a phrase "apple" because the phrases comprise updated lexicon probability distributions between 0.9 and 1). The stratified lexicon (2) 706 may comprise a set of phrases (2) 712. The set of phrases (2) 712 may comprise phrases having an updated lexicon probability within a predefined range 0.8 to 0.9 (e.g., the lexicon "fruit" may comprise the stratified lexicon (2) 706 comprising a phrase "peach" because the phrase "peach" comprises an updated lexicon probability distribution between 0.8 and 0.9). The stratified lexicon (9) 708 may comprise a set of phrases (9) 714. The set of phrases (9) 714 may comprise phrases having an updated lexicon probability within a predefined range 0.1 to 0.2 (e.g., the lexicon "fruit" may comprise the stratified lexicon (9) 714 comprising a phrase "tomato" because the phrase "tomato" comprises an updated lexicon probability distribution between 0.1 and 0.2).

Figure 8:
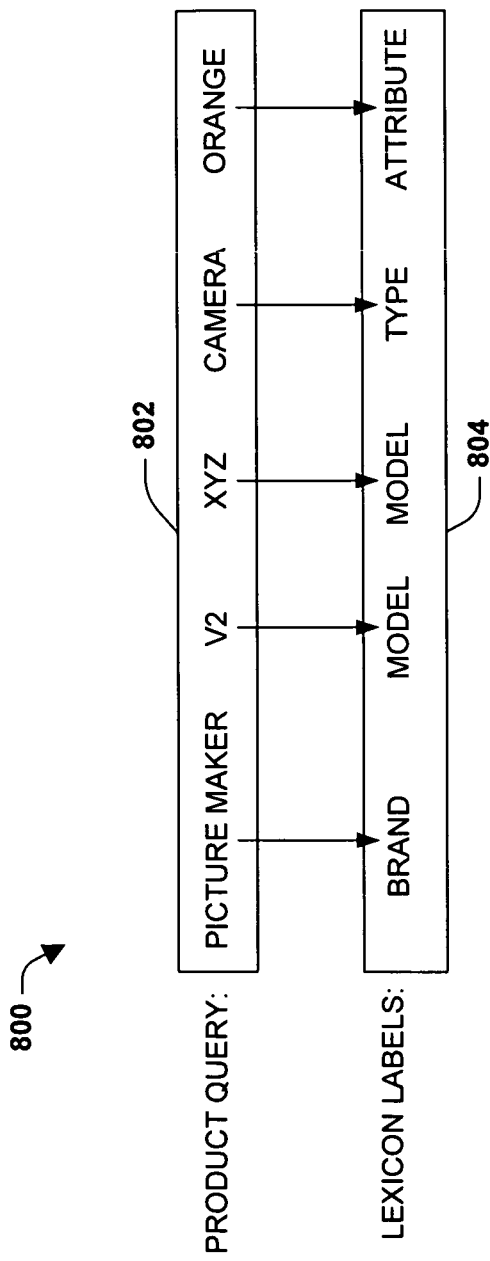
FIG. 8 is an illustration of an example of executing a query tagging model upon one or more terms within a query.

FIG. 8 illustrates an example of executing a query tagging model upon one or more terms within a query. A product query 802 "Picture Maker v2 xyz Camera Orange" comprising one or more terms may be received. For particular terms within the product query 802, labels (e.g., labels derived from lexicons) may be assigned. The labels may be assigned based upon an occurrence of the one or more terms within a stratified lexicon of a corresponding lexicon, as well as other features that relate to the context. For example, a term "Picture Maker" may be labeled with a label "brand" because "Picture Maker", for example, occurs within a stratified lexicon corresponding to a lexicon "brand" and heavily influence the tagging decision made by the query tagging model. A term "v2" may be labeled with a lexicon label "model" because "v2", for example, occurs within a stratified lexicon corresponding to a lexicon "model" and influence the query tagging model's decision to label it as "model". In this way, the query tagging model may be updated.

Figure 9:
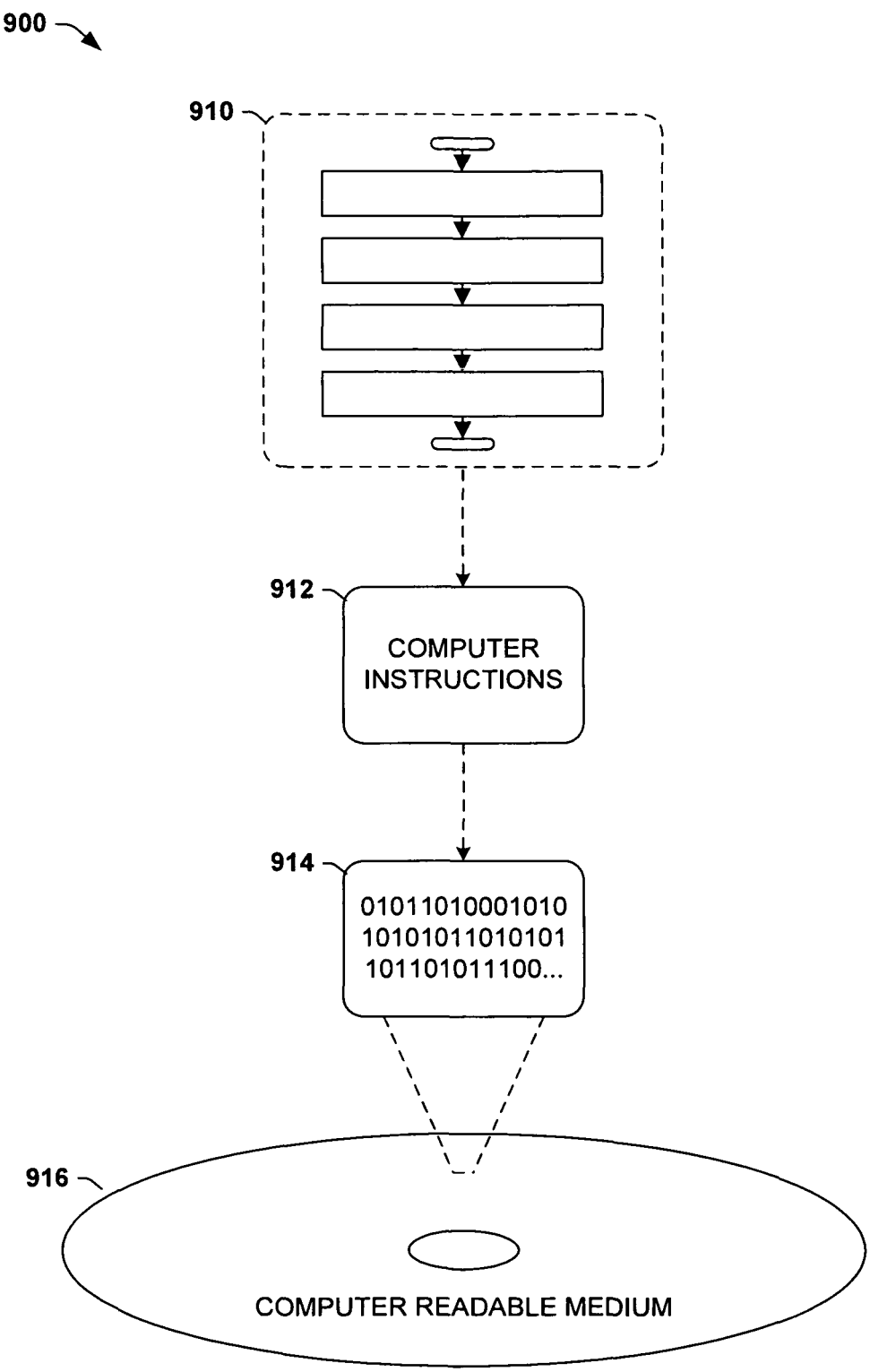
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable instructions 912 may be configured to perform a method 910, such as the exemplary method 100 of FIG. 1, for example. In another such embodiment, the processor-executable instructions 912 may be configured to implement a system, such as the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 10:
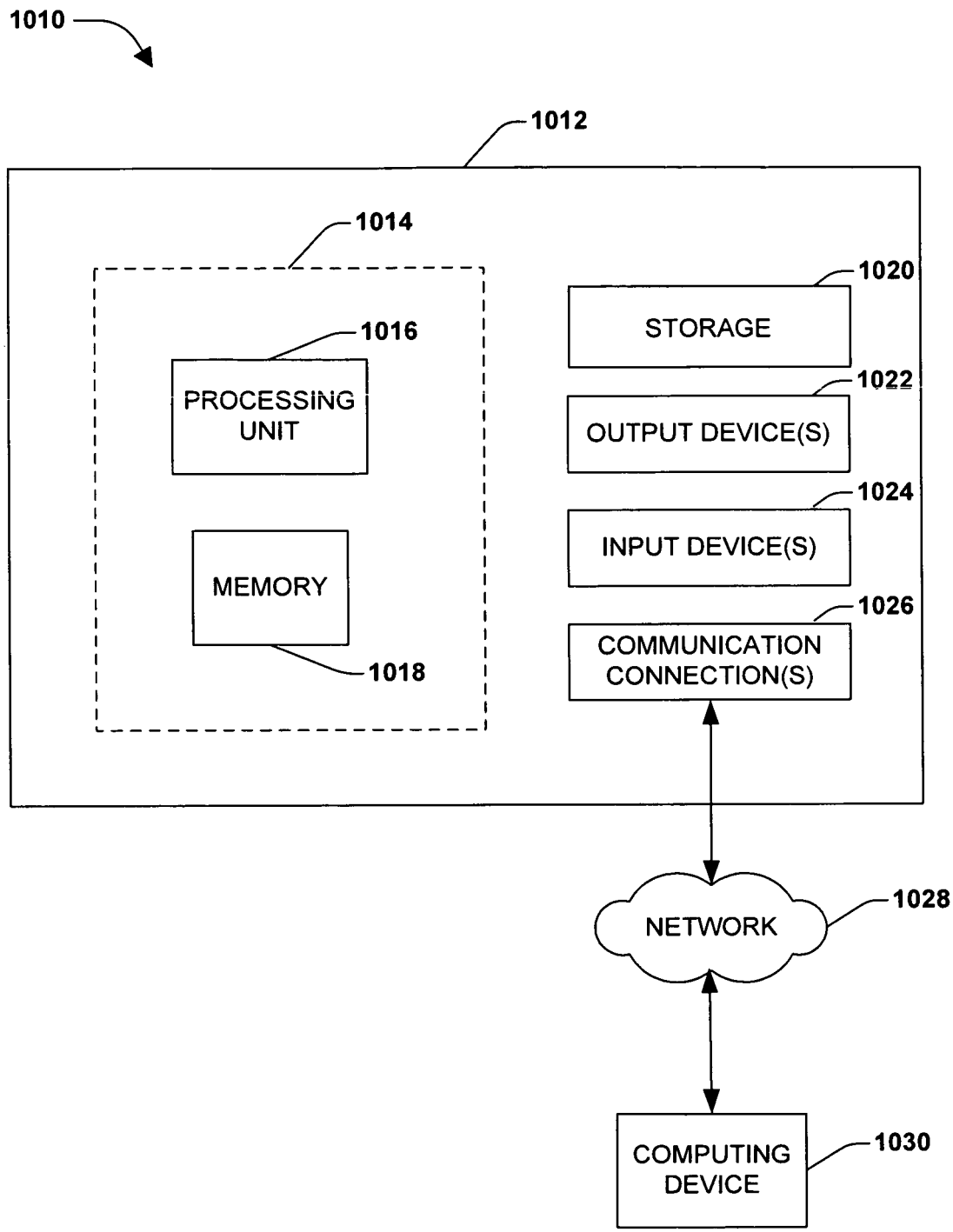
FIG. 10 illustrates an exemplary computing environment wherein one or more of the provisions set forth herein may be implemented.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method performed by a computing device, the method comprising:
    creating seed distribution data comprising a seed phrase and associated seed probabilities that the seed phrase corresponds to a plurality of different lexicons having associated meanings, the seed probabilities including at least:
        a first seed probability assigned to the seed phrase, the first seed probability indicative of a first likelihood that the seed phrase corresponds to a first lexicon associated with a first meaning of the seed phrase, and
        a second seed probability assigned to the seed phrase, the second seed probability indicative of a second likelihood that the seed phrase corresponds to a second lexicon associated with a second meaning of the seed phrase, the first seed probability different than the second seed probability, the first lexicon different than the second lexicon; and
    identifying, from a plurality of web documents, a set of lists of phrases that include the seed phrase as well as other phrases; and
    based at least on the seed probabilities, determining other probabilities that the other phrases correspond to the plurality of different lexicons having the associated meanings.

2. The method of claim 1, further comprising:
    performing a first filtering of the set of lists of phrases by removing certain lists from the set based at least upon a number of phrases occurring within respective lists; and
    performing a second filtering of the set of lists of phrases by removing further lists from the set based at least upon respective lengths of phrases occurring within respective lists,
    wherein the other probabilities are determined after the first filtering and after the second filtering.

3. The method of claim 1, further comprising:
    obtaining a set of labeled training data having different semantic labels for the seed phrase, including a first instance of training data labeling the seed phrase with the first meaning and a second instance of training data labeling the seed phrase with the second meaning,
    wherein the creating the seed distribution data is performed using the set of labeled training data.

4. The method of claim 1, further comprising:
    creating a sub-graph representing appearances of the seed phrase and the other phrases in different lists from the set of lists; and
    assigning list probabilities to individual lists in the sub-graph that include the seed phrase based at least on the seed probabilities,
    wherein the other probabilities are determined based upon the list probabilities.

5. The method of claim 1, further comprising:
    grouping a first set of phrases into a first stratified lexicon and a second set of phrases into a second stratified lexicon, respective first phrases within the first stratified lexicon comprising first lexicon probabilities within a first predefined range and respective second phrases within the second stratified lexicon comprising second lexicon probabilities within a second predefined range of relatively lower lexicon probabilities than the first predefined range.

6. The method of claim 1, further comprising:
    updating a query tagging model based at least in part upon the other probabilities that the other phrases correspond to the plurality of different lexicons having the associated semantic classes.

7. The method of claim 6, further comprising:
    executing the query tagging model upon a query to label a term within the query.

8. A computing device comprising:
    at least one processing unit; and
    at least one memory storing instructions which, when executed by the at least one processing unit, cause the at least one processing unit to:
    identify a first seed phrase and associated first seed probabilities that the first seed phrase corresponds to a plurality of different semantic meanings;
    identify a second seed phrase and associated second seed probabilities that the second seed phrase corresponds to the plurality of different semantic meanings;
    identify, from a plurality of web documents, first lists of phrases that include the first seed phrase as well as first other phrases;
    identify, from the plurality of web documents, second lists of phrases that include the second seed phrase as well as second other phrases;
    based at least on the first seed probabilities, determine first other probabilities that the first other phrases correspond to the plurality of different semantic meanings; and
    based at least on the second seed probabilities, determine second other probabilities that the second other phrases correspond to the plurality of different semantic meanings.

9. The computing device of claim 8, wherein the first seed phrase is the word "orange" and the first seed probabilities include an individual first seed probability that the word "orange" means a type of fruit and another individual first seed probability that the word "orange" means a particular color.

10. The computing device of claim 9, wherein the word "orange" is assigned a relatively higher probability of meaning the type of fruit than of meaning the particular color.

11. The computing device of claim 10, wherein the second seed phrase is the word "electronic" and the second seed probabilities include an individual second seed probability that the word "electronic" refers to music and another individual second seed probability that the word "electronic" refers to a particular type.

12. The computing device of claim 11, wherein the word "electronic" is assigned a relatively higher probability of referring to the particular type than of referring to music.

13. The computing device of claim 8, wherein the web documents comprise HyperText Markup Language (HTML).

14. A computing device comprising:
at least one processing unit; and
at least one memory storing instructions which, when executed by the at least one processing unit, cause the at least one processing unit to:
identify seed probabilities that a seed phrase belongs to different semantic classes, the seed probabilities including at least:
a first seed probability that the seed phrase belongs to a first semantic class, and
a second seed probability that the seed phrase belongs to a second semantic class that is different than the first semantic class;
identify, from a plurality of web documents, phrase lists that include the seed phrase as well as other phrases; and
based at least on the seed probabilities, determine other probabilities that the other phrases included in the phrase lists belong to the different semantic classes, including at least first other probabilities that the other phrases belong to the first semantic class and second other probabilities that the other phrases belong to the second semantic class.

15. The computing device of claim 14, wherein the instructions, when executed by the at least one processing unit, cause the at least one processing unit to:
obtain training data having labeled instances of the seed phrase, including first instances where the seed phrase is labeled as belonging to the first semantic class and second instances where the seed phrase is labeled as belonging to the second semantic class;
determine a first number of times the seed phrase is labeled in the training data as belonging to the first semantic class;
determine a second number of times the seed phrase is labeled in the training data as belonging to the second semantic class;
calculate the first seed probability based at least on the first number of times the seed phrase is labeled in the training data as belonging to the first semantic class; and
calculate the second seed probability based at least on the second number of times the seed phrase is labeled in the training data as belonging to the second semantic class.

16. The computing device of claim 15, wherein the other phrases lack corresponding seed probabilities derived from the training data.

17. The computing device of claim 16, wherein the other phrases do not appear in the training data.

18. The computing device of claim 14, wherein the instructions, when executed by the at least one processing unit, cause the at least one processing unit to:
identify an individual phrase list that includes the seed phrase as well as another seed phrase having other seed probabilities that the another seed phrase corresponds to the different semantic classes; and
determine an individual phrase list probability distribution for the individual phrase list based at least on the seed probabilities and the other seed probabilities, the individual phrase list probability distribution reflecting respective probabilities that individual phrases included in the individual phrase list correspond to the different semantic classes.

19. The computing device of claim 14, wherein the instructions, when executed by the at least one processing unit, cause the at least one processing unit to:
identify an individual phrase that appears in both the individual phrase list and another individual phrase list having another individual phrase list probability distribution reflecting respective probabilities that other phrases included in the another individual phrase list correspond to the different semantic classes; and
determine an individual phrase probability distribution for the individual phrase based at least on the individual phrase list probability distribution and the another individual phrase list probability distribution.

20. The computing device of claim 19, wherein the seed phrase also appears in the another individual phrase list.

21. The computing device of claim 19, wherein the instructions, when executed by the at least one processing unit, cause the at least one processing unit to:
based on the individual phrase probability distribution for the individual phrase, update a query tagging model that tags queries that include the individual phrase according to the different semantic classes.

* * * * *